United States Patent [19]
White et al.

[11] Patent Number: 4,824,500
[45] Date of Patent: Apr. 25, 1989

[54] METHOD FOR REPAIRING DAMAGED COMPOSITE ARTICLES

[75] Inventors: Warren D. White; Paul M. Puckett; Larry T. Blankenship; Mary N. White, all of Lake Jackson, Tex.

[73] Assignee: The Dow Chemical Company, Midland, Mich.

[21] Appl. No.: 116,620

[22] Filed: Nov. 3, 1987

[51] Int. Cl.$^4$ ............................................. B32B 35/00
[52] U.S. Cl. .................................. 156/94; 29/402.09; 29/402.11; 156/98; 156/153; 156/281; 156/307.3; 156/307.7; 156/314; 156/330; 156/334; 428/63; 525/531
[58] Field of Search ....................... 29/402.09, 402.11; 156/94, 98, 153, 281, 307.3, 307.7, 314, 330, 334; 264/36; 428/63; 525/531

[56] References Cited

U.S. PATENT DOCUMENTS

| | | |
|---|---|---|
| 3,564,074 | 2/1971 | Avallone .......................... 525/531 X |
| 3,892,819 | 7/1975 | Najvar . |
| 4,517,038 | 5/1985 | Miller . |
| 4,524,181 | 6/1985 | Adam et al. . |
| 4,594,398 | 6/1986 | Nelson et al. . |
| 4,680,076 | 7/1987 | Bard . |
| 4,690,988 | 9/1987 | Hoffman et al. . |

OTHER PUBLICATIONS

"Basic Aspects of Joining Technology for Fiber Reinforced Plastics" Bashford, D. P.; 1986 Chap. 7 of Developments in Reinforced Plastics-5, ed.
"Room Temperature Curing Resin Systems for Graphite/Epoxy Composite Repair" D. J. Crabtree, Report No. NADC-78101-60, Dec. 1979, pp. 41-52.
"Adhesives for Field Repair of Graphite/Epoxy Composite Structures" D. J. Crabtree, Rept. No. NADC79286-60, Sep. 1981.
"Anaerobic Curing Materials Development" C. B. Delano, et al. Rept. No. AFWAL-TR=81-4025, May 1981, pp. 43-64.
"High Performance, Low-Energy-Curing Resins" Rept. No. NMAB-412, Mar. 1984, pp. 24-26.
"Development of Low Temperature Curing Resins-/Adhesives" vol. 2, Second DOD/NASA Composites Repair Tech. Workshop, pp. 177-205, N11-86.
"Rubber Toughened Unsaturated Polyester and Vinyl Ester Resins" Siebart, 7-85, pp. 7/1-7/9 Toughening of Plastics II.
"Development of Low Temperature Curing Resins and Adhesives for Composite Repair, Part I", Puckett, et al., 19th International SAMPE Tech. Conf. 10-87.
"Repair of Composites", Klein A. J.; Advanced Composites Jul./Aug. 1987, pp. 50-62.
"Epoxy Resin Development for Composite Field Repair" Buckley, et al., Rept. No. NADC-80128-60, 10-80.
"Joining and Repair Procedures for Hetron and Aropol Resin Based FRP Equipment" Technical Bulletin 1548, 1983.
"An Adhesive for Field Repair of Wet Composites" Cochran, et al., 19th Inter. SAMPE Tech. conf. 10-87, pp. 1-13.
"Advanced Composite Repair-Recent Developments & Some Problems" Myhre from Composite Repairs—SAMPE Monograph No. 1, 1985, pp. 14-25.
"Field-Level Repair Materials & Processes" R. H. Sonte, from Composite Repairs—SAMPE Monograph No. 1, 1985, pp. 87-99.
"Composite Repairs"—SAMPE Monograph No. 1, 1985, pp. 1-3, 85-86.

*Primary Examiner*—Robert A. Dawson

[57] ABSTRACT

Damaged composites are repaired by use of a rubber modified vinyl ester resin composition as either an adhesive for bonding metal or cured composite to the area surrounding the damaged area or by placing an uncured reinforcing material saturated with a rubber modified vinyl ester resin composition over the prepared damaged zone and curing in place.

12 Claims, No Drawings

METHOD FOR REPAIRING DAMAGED COMPOSITE ARTICLES

GOVERNMENT CONTRACT INFORMATION

This invention was made with Government support under contract no. F33615-85-C-5081 awarded by the United States Air Force. The Government has certain rights in this invention.

FIELD OF THE INVENTION

The present invention pertains to a method for repairing damaged composite articles.

BACKGROUND OF THE INVENTION

Composites have been employed in the construction of all types of useful articles such as, storage vessels, transportation containers, vehicle parts including cars, trucks, boats and airplanes and the like. These objects as with all objects are subject to damage through use. In many instances, these damages will occur at places remote from adequate repair facilities and it is desirable to have means for expedient and often temporary but structurally sound repairs. One method for repairing these composite articles is to adhere, via adhesive bonding, precured composite or metal repair patches to the damaged area(s) Another method is to remove the damaged portion and rebuild the part under heat and pressure in the same manner as the original part was manufactured. Since these composite objects are employed, for the most part outdoors, they are subjected to all types of environments. In humid environments, the composites tend to absorb moisture which, when subjected to the heat usually involved in curing the patches during their repair, tends to vaporize and cause blistering, disbondment and often delamination. It would be desirable to have available an adhesive and or a resinous binder material for use in the repair of these composite objects which cures at as low a temperature as practical but preferably at a temperature less than that of the epoxy resins which are currently employed in the repair of composite parts or objects. The repair material would most preferably cure below the boiling point of water and produce a polymeric system which has thermal and mechanical properties similar to the composite being repaired.

It would be desirable to have available adhesives or binder resins which are low temperature curable and have sufficient thermal properties, cured strength, and water resistance so as to be suitable for use in the repair of damaged composites.

SUMMARY OF THE INVENTION

The present invention pertains to an improved method for patching damaged composite articles which comprises (a) removing grossly damaged composite from the damaged article, if necessary, and roughening the area to be repaired including an area immediately surrounding the area to be repaired by any suitable means: (b) removing dust and loose particles from the previously roughened area by any suitable means: (c) optionally cleansing the roughened area with a suitable solvent: and (d) either (i) placing one or more plies of a substrate material saturated with a curable resinous composition and retaining said saturated substrate material in place by any suitable means until the composition has gelled sufficiently that any retaining means can be removed: or (ii) bonding to the damaged area of the composite article in the area which has been previously roughened and cleaned one or more plies of metal or reinforced plastic material employing a curable resinous composition as an adhesive for bonding the metal or reinforced plastic material to the damaged area: and (e) subjecting the thus treated damaged area to sufficient heat and pressure to cure the adhesive or saturated substrate material: wherein the improvement resides in employing, as the curable resinous composition, a composition which comprises (A) one or more vinyl ester resins: (B) one or more rubbers or elastomers, (C) one or more curing agents or curing catalysts for the vinyl ester resin(s): and optionally, (D) one or more accelerators for the curing agent(s) or curing catalyst(s).

The present invention provides for adhesive or binder resin compositions which are low temperature curable and have sufficient thermal properties, cured strength, and water resistance so as to be suitable for use in the repair of damaged composites.

DETAILED DESCRIPTION OF THE INVENTION

Suitable vinyl ester resins which can be employed herein include, those disclosed by Bowen in U.S. Pat. Nos. 3,066,112, by Fekete et al in 3,256,226 and 3,301,743, by Bearden in 3,367,992 and by Swisher et al in 3,564,074 all of which are incorporated herein by reference. For the present invention, the diglycidyl ethers of the dihydric phenols suitably have an epoxide equivalent weight (EEW) of from about 170 to about 600, more suitably from about 170 to about 360, most suitably from about 170 to about 250. Particularly suitable are those vinyl ester resins prepared by reacting methacrylic acid with a diglycidyl ether of bisphenol A, a diglycidyl ether of bisphenol F, or a diglycidyl ether of bisphenol K or any combination thereof.

Also suitable are the vinyl ester resins prepared by reacting an ethylenically unsaturated monocarboxylic acid with a novolac epoxy resin. Particularly suitable vinyl ester resins are those prepared by reacting acrylic or methacrylic acid with a polyglycidyl ether of a novolac resin prepared from phenol or cresol and an aldehyde, particularly formaldehyde, which suitably has an epoxide equivalent weight (EEW) of from about 150 to about 220, more suitably from about 170 to about 190.

Also suitable are the vinyl ester resins which have been prepared by reacting an ethylenically unsaturated monocarboxylic acid with the adduct of an aromatic hydroxyl-containing compound and an ethylenically unsaturated hydrocarbon including, those disclosed by D. L. Nelson and M. J. Lamont in U.S. Pat. No. 4,594,398 which is incorporated herein by reference. Particularly suitable are the polyglycidyl ethers of the aromatic hydroxyl-containing compound and the ethylenically unsaturated hydrocarbon which suitably have an epoxide equivalent weight (EEW) of from about 150 to about 350, more suitably from about to about 300.

A particularly suitable curable binder resin composition for the substrate material or adhesive composition which can be employed in the repair method of the present invention includes a vinyl ester resin selected from (a) vinyl ester resins prepared by reacting at least one ethylenically unsaturated monocarboxylic acid with an epoxy resin having an average of not more than 2 vicinal epoxy groups per molecule and an EEW of from about 170 to about 600: and optionally either or both of the following resins (b) and (c), (b) vinyl ester resins prepared by reacting an ethylenically unsaturated monocarboxylic acid with an epoxy resin which is the polyglycidyl ether of an adduct of an ethylenically unsaturated hydrocarbon and a compound having at least one phenolic hydroxyl group per molecule, said epoxy resin having an average of more than 2 vicinal epoxy groups per molecule and an EEW of from about 150 to about 350: or (c) vinyl ester resins prepared by reacting at least one ethylenically unsaturated monocarboxylic acid with an epoxy resin which is a polyglycidyl ether of a novolac resin prepared by reacting an aldehyde with a compound having at least one phenolic hydroxyl group per molecule, said epoxy resin having an average of more than 2 vicinal epoxy groups per molecule and an EEW of from about 150 to about 220:

wherein at least one of said vinyl ester resins has been modified with a rubber or elastomer wherein the total amount of rubber or elastomer is from about 2 to about 20 percent by weight based on the combined weight of vinyl ester resin(s), rubber(s) or elastomer(s) and reactive diluent(s).

Another particularly suitable curable binder resin composition for the substrate material or adhesive composition which can be employed in the repair method of the present invention includes vinyl ester resins which have been prepared by reacting at least one ethylenically unsaturated monocarboxylic acid with an epoxy resin selected from (a) a diglycidyl ether of a compound having two aromatic hydroxyl groups per molecule, said diglycidyl ether having an EEW of from about 170 to about 600: and optionally either or both of the following resins (b) and (c), (b) a polyglycidyl ether of an adduct of an ethylenically unsaturated hydrocarbon and a compound having at least one phenolic hydroxyl group per molecule, said polyglycidyl ether having an average of more than 2 vicinal epoxy groups per molecule and an EEW of from about 150 to about 350; or (c) a polyglycidyl ether of novolac resin prepared by reacting an aldehyde with a compound having at least one phenolic hydroxyl group per molecule, said polyglycidyl ether having an average of more than 2 vicinal epoxy groups per molecule and an EEW of from about 150 to about 220: and (d) a rubber or elastomer in an amount of from about 2 to about 20 percent by weight based on the combined weight of vinyl ester resin(s), rubber(s) or elastomer(s) and reactive diluent(s).

In the preparation of the vinyl ester resins, essentially any ethylenically unsaturated monocarboxylic acid can be employed. Particularly suitable are ethylenically unsaturated organic carboxylic acids which can be aliphatic, cycloaliphatic or aromatic, and can be monocarboxylic or polycarboxylic. Examples of the acids which can be utilized include acrylic acid, methacrylic acid, cyclohexene carboxylic acid, maleic acid, crotonic acid, alpha-phenylacrylic acid, tetrahydrophthalic acid, 2,4-octadienedicarboxylic acid, dodecadienoic acid and the like.

Particularly preferred acids include the ethylenically unsaturated acids such as, for example, acrylic acid, methacrylic acid, crotonic acid, alpha-phenylacrylic acid, alpha-cyclohexylacrylic acid, maleic acid, alpha-chloromaleic acid, tetrahydrophenolic acid, itaconic acid, fumaric acid, cyanoacrylic acid, methoxyacrylic acid, and the like.

Also particularly preferred are the partial esters of polycarboxylic acids, and particularly the alkyl, alkenyl, cycloalkyl and cycloalkenyl esters of polycarboxylic acids such as, for example, allyl hydrogen maleate, butyl hydrogen maleate, allyl hydrogen tetrahydrophthalate, allyl hydrogen succinate, allyl hydrogen fumarate, butenyl hydrogen tetrahydrophthalate, cyclohexenyl hydrogen maleate, cyclohexyl hydrogen tetrahydrophthalate, and the like, and mixtures thereof.

If desired, an anhydride of an unsaturated acid such as, for example, maleic anhydride can be employed in combination with the monocarboxylic acids, or partial ester of a polycarboxylic acid in the preparation of the vinyl ester resins which are suitable for use herein.

When a mixture of vinyl ester resins are employed, it does not matter whether the vinyl ester resins are prepared separately and one or both of them modified with a rubber or elastomer and subsequently blended, or the different epoxy resins being blended together and subsequently reacted with the ethylenically unsaturated monocarboxylic acid and rubber or elastomer, so long as the proper amounts of the various components are employed.

The vinyl ester resins can be modified with any suitable rubber or elastomer. Suitable rubbers or elastomers include, for example, carboxyl-containing rubbers or elastomers, vinyl-containing rubbers or elastomers, polymers of alkyl acrylates or methacrylates or alkyl esters of other alpha-alkyl substituted ethylenically unsaturated acids, or grafted rubber particles characterized by having a rubbery core and a grafted polymer shell which is compatible with vinyl ester resins. Vinyl ester resins can be modified with a carboxyl-containing rubber or elastomer by the method disclosed by D. J. Najvar in U.S. Pat. No. 3,892,819 which is incorporated herein by reference. Particularly suitable rubbers or elastomers are the carboxyl-containing butadiene/acrylonitrile rubbers or elastomers. Other rubbers or elastomers which can be employed similarly include poly(butadiene/acrylonitrile) copolymers which contain terminal or pendant vinyl or amine groups. These rubbers or elastomers containing acrylate, vinyl, secondary amine groups, or carboxyl-containing moieties are commercially available from the B. F. Goodrich Company under the tradename HYCAR.

Another particularly suitable form of rubber or elastomer for modification of the vinyl ester compositions of the present invention includes poly(alkylacrylate) or poly(alkylmethacrylate) polymers produced by the methods disclosed by D. K. Hoffman et al in U.S. Pat. No. 4,690,988 which is incorporated herein by reference. These rubbers or elastomers can also contain minor amounts of carboxyl-containing and/or glycidyl ether-containing monomers polymerized therein.

Other rubbers or elastomers which can be similarly employed include polymers formed by polymerizing monomers in situ in the epoxy resin in the presence of a stabilizer to form a stable dispersed polymer phase according to the methods disclosed by D. K. Hoffman and C. Arends in allowed copending application Ser. No. 664,672 filed Oct. 25, 1984, now U.S. Pat. No. 4,708,996 issued Nov. 24, 1987 and also by R. E. Adam et al. in U.S. Pat. No. 4,524,181, both of which are incorporated herein by reference.

Another particularly suitable form of rubber or elastomer for modification of the vinyl esters of the present invention includes those available in the form of a rubber-modified epoxy composition comprising (1) an epoxy resin continuous phase and (2) a stabilized discontinuous phase of grafted rubber particles, which particles have a resin-insoluble rubbery core with a shell which is compatible with the epoxy phase but has latent reactivity with a curing agent. These grafted rubber concentrates (GRC) can be prepared by the methods described by D. E. Henton, C. B. Arends, D. M. Pickelman and V. E. Meyer in copending application Ser. No. 002,535, filed Jan. 12, 1987, now U.S. Pat. No. 4,778,851, which is incorporated herein by reference. Preferred grafted rubber compositions have, as the rubbery core components, conjugated dienes such as butadiene and isoprene, acrylate rubbers such as 2-ethylhexyl acrylate and butyl acrylate rubber and interpolymers. Particularly preferred are cores of crosslinked butadiene rubber. Preferred compounds for the grafted shell are polymers of ethylenically unsaturated compounds such as styrenics, acrylates and methacrylates, acrylonitrile, acrylic and methacrylic acid, vinylized glycidyl ethers such as glycidyl acrylate and methacrylate, combinations thereof and the like. The shell compounds contain a functionality which reacts with functionalities of the epoxy resin continuous phase. Vinyl ester resins can be prepared from these grafted-rubber modified epoxy resins by methods known in the art for use in the claimed invention.

The amount of rubber or elastomer in the vinyl ester resin composition is suitably from about 2 to about 20, more suitably from 3 to about 12, most suitably from 3 to about 10, percent by weight based on the combined weight of the vinyl ester resin(s), rubber or elastomer and diluent(s) (polymerizable monomers which are often employed with the vinyl ester resins).

Suitable polymerizable ethylenically unsaturated monomers (diluents) which can be employed include those disclosed by the aforementioned U.S. Pat. Nos. 3,892,819 and 4,594,398. Particularly suitable polymerizable ethylenically unsaturated monomers include, for example, aromatic compounds such as styrene, alpha-methylstyrene, dichlorostyrene, vinyl naphthalene, divinyl benzene and the like, unsaturated esters, such as acrylic and methacrylic esters, vinyl acetate, vinyl benzoate, vinyl chloroacetate, vinyl laurate, and the like, unsaturated acids, such as acrylic and alpha-alkylacrylic acid, butenoic acid, allylbenzoic acid, vinylbenzoic acid, and the like, halides, such as vinyl chloride, vinylidene chloride, nitriles, such as acrylonitrile, methacrylonitrile, diolefins, such as butadiene, isoprene, methylpentadiene, esters of polycarboxylic acids, such as diallyl phthalate, divinyl succinate, diallyl maleate, divinyl adipate, dichloroallyl tetrahydrophthalate, and the like, and mixtures thereof.

The polymerizable ethylenically unsaturated monomers (diluents) are employed in amounts which correspond to suitably from zero up to about 60, more suitably from about 10 to about 55, most suitably from about 20 to about 50 percent by weight based upon the combined weight of monomer and modified vinyl ester resin.

Suitable curing agents or catalysts include those which generate free radicals such as organic peroxides, azo compounds, and the like. Particularly suitable such curing agents or catalysts include, for example, the peroxides such as benzoyl peroxide, tertiary-butyl hydroperoxide, ditertiary-butyl peroxide, methyl ethyl ketone peroxide, hydrogen peroxide, potassium persulfate, methyl cyclohexyl peroxide, cumene hydroperoxide, acetyl benzoyl peroxide, tetralin hydroperoxide, phenylcyclohexane hydroperoxide, tertiary-butylisopropylbenzene hydroperoxide, tertiary-butyl peracetate, tertiarybutylperoctoate, tertiary-butyl perbenzoate, ditertiary-amyl perphthalate, ditertiary-butyl peradipate, tertiary-amyl percarbonate, bis(4-t-butylcyclohexyl)peroxydicarbonate, and the like and azo compounds such as 2,2'-azobisisobutyronitrile, dimethyl 2,2'-azobisisobutyrate, 2,2'-azobis(2,4-dimethylvaleronitrile, 2,2'-azobisisotoluylamide, and the like. Mixtures of catalyst can also be employed. Particularly preferred catalysts include the diaroyl peroxide, tertiary-alkyl hydroperoxides, alkyl peresters of percarboxylic acids and particularly those of the above noted groups which contain no more than 18 carbon atoms per molecule.

The curing agents or catalysts are suitably employed in amounts of from about 0.1 to about 5, more suitably from about 0.1 to about 3, percent by weight based on total resin weight.

Also, if desired, accelerators for the curing agents or catalysts can be employed. Suitable such accelerators include, metal salts of carboxylic acids such as, for example, cobalt naphthenate either alone or in combination with tertiary amines such as N,N-dimethylaniline, N,N-diethylaniline or N,N-dimethylacetoacetamide or N,N-dimethylparatoluidine.

The accelerators are suitably employed in amounts of from about 0.02 to about 1, more suitably from about 0.05 to about 0.6 percent by weight based on total resin weight.

The compositions of the present invention can also, if desired, contain reinforcing materials in the form of mats, woven fabric, undirectional fibers, rovings, random fibers or filaments, inorganic fillers, inorganic whiskers, hollow spheres, ceramic or glass spheres and the like. These reinforcing materials can be prepared from glass fibers, aramid fibers, graphite fibers, polymer fibers such as, for example, nylon fibers, polyalkylene terphthalate fibers, polyethylene fibers, polypropylene fibers, polyester fibers, combinations thereof and the like.

If desired, other components can be included in the compositions of the present invention, such as, for example, pigments, dyes, fillers, wetting agents, stabilizers, and the like. These components are included in amounts which are effective for their purpose, e.g. pigments and dyes are employed in amounts sufficient to color the composition to the extent desired and wetting agents are employed in amounts sufficient to wet out any reinforcing materials present in the compositions.

A method for repairing composite articles is described by A. J. Klein in "Repair of Composites", *Advanced Composites,* July/August 1987, pages 50-62; and "BASIC ASPECTS OF JOINING TECHNOLOGY FOR FIBRE REINFORCED PLASTICS" by D. P. Bashford, Chap. 7 of *Developments in Reinforced Plastics-5,* ed. by G. Pritchard, Elsevier Applied Science Publishers, London, New York, 1986 discloses methods for joining composites, including adhesive bonding: both of which are incorporated herein by reference.

In the method of patching or repairing damaged composite articles, the damaged area and an area immediately surrounding the damaged area can be prepared by removal of grossly damaged composite, when necessary, and then roughening the area by any suitable means such as by hand or machine grinding with the appropriate tools, sanding with portable sanding tools or by hand, rasps and the like equipment and means.

The dust and other particles resulting from roughening the damaged area and the area surrounding it can be removed by wiping it with any suitable means, such as cloth of any kind, paper towels and the like or the use of forced air or combinations of these methods.

If desired, the thus roughened area can be further treated by washing or wiping with a solvent to remove grease and the like. Suitable solvents include, for example, alcohols, glycols, hydrocarbons, esters, halogenated hydrocarbons, ketones, glycol ethers, combinations thereof and the like.

After the area has been properly prepared, a repair of the part can be carried out via adhesively bonding thereto a prepared part of the proper dimensions with or without additional mechanical fastening, or via the cocuring of a fiber reinforced resinous patch of the proper dimensions to restore the mechanical properties of the damaged part.

The adhesively bonded repair is performed by applying a thin smooth layer of rubber modified vinyl ester resin, which has been admixed with the necessary curing agents or curing catalysts, and if, desired, accelerators and any required fillers or reinforcements, between the prepared surface of the damaged composite and the preformed patch, which can be metal, or reinforced composite. The patch can be maintained in place by any suitable means including tape, straps, and the like, but most preferably, with applied pressure usually from atmospheric pressure translated via a vacuum bag over the part. The rubber modified vinyl ester resin is then cured by heating the part which completes the repair. Heating can be accomplished by means of infrared heat lamps, hot air blowers, heating blankets, heating pads, combinations thereof and the like.

The cocured repair is performed by application of a rubber modified vinyl ester resin, which has been mixed with the necessary curing agents or catalysts and, if desired, accelerators, onto a fibrous reinforcement, normally in the form of a mat. An appropriate number of these substrate materials which have been saturated with the curable resinous composition are placed onto the prepared surface. The patch can be maintained in place by any suitable means as mentioned above. Curing can be accomplished by heating as described above.

The following examples are illustrative of the invention, but are not to be construed as to limiting the scope thereof in any manner.

EXAMPLE 1

A rubber modified epoxy resin was prepared by reacting 200 g of a diglycidyl ether of bisphenol A (173 EEW) with 28 g of bisphenol A to yield a calculated EEW of 250 and 101.6 g of a carboxyl-modified acrylonitrile/butadiene rubber in presence of 0.42 g of a 70 weight percent methanolic solution of tetrabutylphosphonium acetate.acetic acid complex catalyst. The rubber modified epoxy resin is blended with 684 g of an epoxy resin prepared from an ethylenically unsaturated hydrocarbon and phenol having a functionality of about 3.2 (265 EEW). The mixture of epoxy resins is reacted catalytically with a stoichiometrically equivalent amount of methacrylic acid (315 g) in the presence of air and hydroquinone, 400 ppm, until an acid content of about 1% is reached.

A portion, 64 parts by weight (pbw), of the above prepared rubber modified vinyl ester resin is dissolved in styrene to yield a blend containing about 36 parts by weight of styrene. This blend is designated as Example 1-A. Properties of the resin are listed in Table I.

Another portion, 64 pbw of the above prepared rubber modified vinyl ester resin is dissolved in a blend of the ethylenically unsaturated monomers containing about 10 percent divinyl benzene and 90 percent styrene by weight. This blend is designated as Example 1-B. The properties of the resin are reported in Table I.

COMPARATIVE EXPERIMENT A

A reactor is charged with 600 g of an epoxy resin prepared from dicyclopentadiene and phenol having an average functionality of about 3.2 and an epoxide equivalent weight (EEW) of 265. The resin is heated at 120° C. for 1 hour with 0.43 g of a 70 weight percent methanolic solution of ethyltriphenylphosphonium acetate.acetic acid complex catalyst with a nitrogen sparge. To the resulting mixture is added 200 g of the diglycidyl ether of bisphenol A having an EEW of 179 thereby forming a homogeneous solution having an EEW of 242. The mixture of epoxy resins is reacted catalytically with a stoichiometric equivalent amount (283 g) of glacial methacrylic acid in the presence of air and 400 ppm hydroquinone at 100° C. to 115° C. until a 1.1% acid concentration is reached. The vinyl ester resin is dissolved in 611 g of styrene to yield a blend containing about 36 percent styrene by weight.

COMPARATIVE EXPERIMENT B

The procedure of Comparative Experiment A was employed except that the resulting vinyl ester resin is dissolved in 553 g of styrene and 62 g of divinyl benzene to yield a blend containing 36 percent polymerizable monomers by weight. The monomer mixture consists of 90% styrene and 10% divinyl benzene by weight.

EXAMPLE 2

The vinyl ester resin prepared in Comparative Experiment B is mixed with a vinyl-terminatd butadiene-acrylonitrile rubber obtained from B. F. Goodrich Chemicals as HYCAR 1300X23 VTBNX to produce a blend containing 5% rubber by weight.

EXAMPLE 3

The vinyl ester resin prepared in Comparative Experiment B is mixed with a vinyl-terminated butadiene-acrylonitrile rubber obtained from B. F. Goodrich Chemicals as HYCAR 1300X23 VTBNX to produce a blend containing 10% rubber by weight.

EXAMPLE 4

A reactor is charged with 2588 g of diglycidyl ether of bisphenol A having an EEW of 181, 315 g of bisphenol A and 772 g of a carboxyl-containing butadiene-acrylonitrile rubber obtained from B. F. Goodrich Chemicals as HYCAR 1300X18 CTBNX. The mixture is reacted in the presence of a 70% methanolic solution of tetrabutylphosphonium acetate.acetic acid complex catalyst.at 150° C. under a nitrogen atmosphere for 1.5 hours to form a rubber modified polyepoxide having an EEW of 330-350. This resin is reacted catalytically at about 100° C. with 726 g (1 molar equiv.) of glacial methacrylic acid in the presence of air and 400 ppm hydroquinone for about 3 hours to reach a carboxylic acid content of 1.2%. The solution is cooled to 80° C. before dilution with 2951 g of styrene to yield a blend containing about 40% styrene by weight.

COMPARATIVE EXPERIMENT C

A reactor is charged with 600 g of an epoxy resin prepared from a phenol-formaldehyde novolac resin having an average functionality of 3.6 and an EEW of 180. The resin is heated at 120° C. for 1 hour with 0.4 g of a 70% methanolic solution of ethyltriphenylphosphonium acetate.acetic acid complex catalyst with a nitrogen sparge. A 200 g aliquot of a diglycidyl ether of bisphenol A having an EEW of 181 is added to produce a resin blend having an EEW of 180. The mixture of epoxy resins is reacted catalytically with a stoichiometrically equivalent amount (385 g, of glacial methacrylic acid in the presence of air and 400 ppm hydroquinone at 100° C. to 115° C. until a 1.1% acid concentration is reached. The resultant vinyl ester resin is dissolved in styrene such that the resultant mixture has a styrene content of about 36 weight percent.

COMPARATIVE EXPERIMENT D

A reactor is charged with 600 g of an epoxy resin prepared from dicyclopentadiene and phenol having an average functionality of about 3.2 and an epoxide equivalent weight (EEW) of 265. The resin is heated at 120° C. for 1 hour with 0.43 g of a 70 weight percent methanolic solution of ethyltriphenylphosphonium acetate.acetic acid complex catalyst with a nitrogen sparge. To the resulting mixture is added 200 g of the diglycidyl ether of bisphenol A having an EEW of 179 thereby forming a homogeneous solution having an EEW of 208. The mixture of epoxy resins is reacted catalytically with a stoichiometric equivalent amount (322 g) of glacial methacrylic acid in the presence of air and 400 ppm hydroquinone at 100° C. to 115° C. until a 1.1% acid concentration is reached. The vinyl ester resin is dissolved in 508 g of styrene and 127 g of divinyl benzene to yield a blend containing about 36 percent monomeric diluent by weight. The diluent contained 80% by weight styrene and 20% by weight divinylbenzene.

EXAMPLE 5

The vinyl ester resin prepared in comparative Experiment D is mixed in a one to one weight ratio with the vinyl ester resin prepared in Example 4, to produce a blend containing 4.9% CTBNX rubber.

EXAMPLE 6

The vinyl ester resin prepared in Example 4 is mixed in a one to one weight ratio with the vinyl ester resin prepared in comparative experiment C, to produce a blend containing 4.9% CTBNX rubber.

COMPARATIVE EXPERIMENT E

A reactor is charged with 400 g of an epoxy resin prepared from dicyclopentadiene and phenol having an average functionality of about 3.2 and an epoxide equivalent weight (EEW) of 265 and 400 g of an epoxy resin prepared from a phenol-formaldehyde resin having an average functionality of 3.6 and an EEW of 180. The resin is heated at 120° C. for 1 hour with 0.6 g of a 70 weight percent methanolic solution of ethyltriphenylphosphonium acetate.acetic acid complex catalyst with a nitrogen sparge. The mixture of epoxy resins is reacted catalytically with a stoichiometric equivalent amount (283 g, of glacial methacrylic acid in the presence of air and 400 ppm hydroquinone at 100° C. to 115° C. until a 1.1% acid concentration is reached. The vinyl ester resin is dissolved in 609 g of styrene to yield a blend containing about 36 percent styrene by weight.

COMPARATIVE EXPERIMENT F

The procedure of Comparative Experiment E is employed except that the resulting vinyl ester resin is dissolved in a 4/1 weight ratio mixture of styrene (487 g)/divinyl benzene (122 g) which produces a blend containing 36 parts by weight diluent.

EXAMPLE 7

The vinyl ester resin prepared in comparative Experiment F is mixed in a one to one weight ratio with the vinyl ester resin prepared in Example 4, to produce a blend containing 4.9% CTBNX rubber.

EXAMPLE 8

A reactor is charged with 80 g of a diglycidyl ether of bisphenol A having an EEW of 181, 28.2 g of bisphenol A and 240 g of a diglycidyl ether of bisphenol A having a base resin EEW of 174 and containing 40 percent by weight of 2-ethylhexyl acrylate copolymer rubber prepared by the method disclosed by Hoffman et al. in Example 3 of U.S. Pat. No. 4,690,988 wherein a mixture of 2 parts t-butylperoctoate and 1 part t-butyl perbenzoate are used instead of 2,2′-azobisisobutyronitrile: and the catalyst and monomer mixture are added over 2 hours to the epoxy resin instead of the mixture of initiator, monomers and resin being added over a period of one hour. The resultant epoxy resin-rubber dispersion has an EEW of 290. The mixture is reacted in the presence of a 70% methanolic solution of tetrabutylphosphonium acetate.acetic acid complex catalyst at 150° C. under a nitrogen atmosphere for 1.5 hours to form a rubber modified polyepoxide having an EEW of 314. This product is blended with 593 g of an epoxy resin prepared from dicyclopentadiene and phenol having a functionality of 3.2 and an EEW of 250. The mixture of resins is reacted catalytically at 115° C. with 302 g (1 molar eqiiv.) of glacial methacrylic acid in the presence of air and 400 ppm hydroquinone for 3.2 hours to reach a carboxylic acid content of 1.2%. The reactants are cooled to 80° C. before dilution with 701 g of styrene to yield a blend containing 36 percent styrene by weight.

EXAMPLE 9

A reactor is charged with 60 g of a diglycidyl ether of bisphenol A having an EEW of 181, 26.9 g of bisphenol A and 240 g of a diglycidyl ether of bisphenol A having a base resin EEW of 174 and containing 40% by weight 2-ethylhexyl acrylate copolymer rubber prepared by the same method of Example 8. The mixture is reacted in the presence of tetrabutylphosphonium acetate.acetic acid complex catalyst under a nitrogen atmosphere for 1.5 hours at 150° C. to form a rubber modified polyepoxide having an EEW of 350. This product is blended with 539 g of an epoxy resin prepared from a phenol formaldehyde novolac having an average functionality of 3.6 and an EEW of 222. The mixture of resins is reacted catalytically at 115° C. with 342 g, (1 molar equiv.) of glacial methacrylic acid in the presence of air and 400 ppm hydroquinone for 3.2 hours to reach a carboxylic acid content of 1.2%. The reactants are cooled to 80° C. before dilution with 680 g of styrene to yield a blend containing about 36 percent styrene by weight.

EXAMPLE 10

The resins prepared in the foregoing examples and comparative experiments are cured by blending with 0.3 phr (parts per hundred parts resin+monomer(s)) cobalt naphthenate and 1.22 phr of methyl ethyl ketone peroxide (8.8% active oxygen). The resins are cured 16 hours at 25° C. and post cured for 2 hours at 155° C. After cooling, the cured resins are prepared for testing by the following methods: ASTM D-638 (tensile); ASTM D-790 (flexural) and ASTM D-648 (heat distortion temperature, HDT).

The properties of the cured resins are given in Table I.

TABLE I

| Example or Comp. Expt. | Weight Ratios of Base Resin Components | | | | Weight Ratios of Diluent Components | | Weight Ratio of resin to Diluent | Clear Casting Properties | | | | | | | |
|---|---|---|---|---|---|---|---|---|---|---|---|---|---|---|---|
| | PFN Epoxy Resin a | DCPD Phen. Resin b | DGEBA Resin c | Rubber Content | Styrene wt. % | Divinyl-benzene wt. % | | Tensile Strength psi (kPa) | Tensile Modulus psi $\times 10^{-5}$ (kPa $\times 10^{-5}$) | Elong. % | Flexural Strength psi (kPa) | Flexural Modulus psi $\times 10^{-5}$ (kPa $\times 10^{-5}$) | HDT °F. (°C.) | Barcol Hardness 934-1 | Water Uptake Wt. % |
| Ex. 1A | — | 75 | 25 | 4.9% CTBNX | 100 | — | 64/36 | 12,200 (84,117) | 4.42 (30.48) | 4.68 | 23,300 (160,649) | 5.09 (35.09) | 253 (123) | 44 | 1.16 |
| Ex. 1B | — | 75 | 25 | 4.8% CTBNX | 90 | 10 | 64/36 | 12,400 (85,496) | 4.39 (30.27) | 4.52 | 21,200 (146,170) | 5.02 (34.61) | 264 (129) | 44 | 1.14 |
| C.E. A* | — | 75 | 25 | — | 100 | — | 64/36 | 11,300 (77,911) | 5.12 (35.30) | 2.90 | 17,600 (121,348) | 5.10 (35.16) | 282 (139) | 45 | 1.16 |
| C.E. B* | — | 75 | 25 | — | 90 | 10 | 64/36 | 9,000 (62,053) | 4.63 (31.92) | 2.31 | 20,100 (138,585) | 5.34 (36.82) | 295 (146) | 46 | 1.22 |
| Ex. 2 | — | 75 | 25 | 5.0% VTBNX | 90 | 10 | 64/36 | 10,100 (69,637) | 4.03 (27.79) | 4.73 | 18,400 (126,864) | 4.60 (31.72) | 282 (139) | 44 | 1.22 |
| Ex. 3 | — | 75 | 25 | 10% VTBNX | 90 | 10 | 64/36 | 8,600 (59,295) | 3.41 (23.51) | 5.20 | 14,600 (100,664) | 3.90 (26.89) | 277 (136) | 38 | 1.36 |
| Ex. 4 | — | — | 100 | 10% CTBNX | 100 | — | 60/40 | 10,000 (68,948) | 3.6 (24.8) | 8.5 | 18,500 (127,554) | 4.9 (33.8) | 172 (78) | — | — |
| Ex. 5 | — | 38 | 62 | 4.9% CTBNX | 90 | 10 | 62/38 | 11,300 (77,911) | 4.52 (31.16) | 4.10 | 18,800 (129,622) | 5.10 (35.16) | 241 (116) | — | 1.21 |
| Ex. 6 | 38 | — | 62 | 4.9% CTBNX | 100 | — | 62/38 | 11,700 (80,660) | 4.48 (30.89) | 4.84 | 20,600 (142,033) | 5.04 (34.7) | 235 (113) | — | 1.47 |
| Ex. 7 | 25 | 25 | 50 | 4.9% CTBNX | 90 | 10 | 62/38 | 11,500 (79,290) | 4.37 (30.13) | 3.92 | 19,700 (135,828) | 4.99 (34.41) | 257 (125) | 43 | 1.26 |
| Ex. 8 | — | 70 | 30 | 4.9% CTBNX | 100 | — | 64/36 | 11,200 (77,222) | 4.3 (29.6) | 5.5 | 19,800 (136,517) | 4.8 (33.1) | 284 (140) | — | — |
| Ex. 9 | 70 | — | 30 | 5.1% ACRYLATE | 100 | — | 64/36 | 10,700 (73,774) | 4.3 (29.6) | 4.5 | 17,600 (121,348) | 4.8 (33.1) | 274 (134) | — | — |
| C.E. C* | 75 | — | 25 | ACRYLATE | 100 | — | 64/36 | 11,100 (76,535) | 5.02 (34.68) | 2.7 | 18,000 (124,110) | 5.62 (38,75) | 300 (149) | 40 | — |
| C.E. D* | — | 75 | 25 | — | 80 | 20 | 64/36 | 8,700 (55,985) | 4.75 (34.61) | 2.20 | 17,200 (118,591) | 5.50 (37.92) | 304 (151) | 46 | 1.21 |
| C.E. E* | 50 | 50 | — | — | 100 | — | 64/36 | 9,920 (68,396) | 5.16 (35.58) | 2.38 | 17,800 (122,727) | 5.37 (37.03) | 307 (153) | 46 | 1.29 |
| C.E. F* | 50 | 50 | — | — | 80 | 20 | 64/36 | 9,050 (62,391) | 5.06 (34.88) | 2.10 | 18,700 (128,933) | 5.78 (39.9) | 322 (161) | 47 | 1.35 |

EXAMPLE 11

The rubber modified resin prepared in Example 1 and designated as Example 1-A is cured with 1 phr of benzoyl peroxide and 0.05 phr N,N-dimethylparatoluidine as an accelerator for 2 hours at 82° C. The glass transition temperature determined on a Mettler TA-3000 thermal mechanical analyzer is 132° C. (270° F.).

EXAMPLE 12

A laminate is prepared from the rubber modified resin prepared in Example 1 and designated as Example 1-A and 6 plies of a graphite fiber fabric and cured under 12 psig (82.7 kPa) at 80° C. for 30 minutes. The curing catalyst is benzoyl peroxide, 1 phr. The finished laminate contains 68 percent by weight graphite fiber and 32 percent by weight resin.

EXAMPLE 13

A laminate is prepared from the rubber modified resin of Example 1 catalyzed with 1.5% by weight cumene hydroperoxide and 0.3% by weight cobalt naphthenate (6% by weight cobalt) as an accelerator. The laminate was reinforced as a symmetrical layup with four layers as follows: fiber glass corrosion-veil/chopped strand mat/mat/veil. The laminate is prepared by hand rolling the resin into each layer of reinforcement on a MYLAR covered aluminum plate. After all layers of reinforcement are saturated with resin, the layers are stacked and covered with another MYLAR sheet and aluminum plate. The plates are pressed together and the laminate is cured at 131° C. for two hours. The cured laminate has a tensile strength of 18,500 psi (128,000 kPa) and a flexural modulus of 870,000 psi (6.0 × 10$^6$ kPa).

EXAMPLE 14

A nine ply carbon epoxy composite (6 in.×8 in.×0.125 in.: 152.4 mm×203.2 mm×3.175 mm) is ground to approximately half thickness in an area near the center of about 3 in.×8 in.×0.0625 in. (76.2 mm×203.2 mm×1.588 mm) to produce a defect in the composite. A scarf lay-up of 5 plies is made with the resin of Example 6 catalyzed with 1.25 phr of cumene hydroperoxide and 0.3 phr of cobalt naphthenate. The catalyzed resin is used to saturate 8 harness satin weave AS-4 graphite fabric which is used to patch the defective area of the composite. The resinous patch is consolidated with an appied 15 psig (103.4 kPa) pressure and heated at 82° C. for two hours. An ultrasonic evaluation of the patched area shows very low void content. Failure analysis in the flexural mode performed on a portion of the sample is observed to fail such that the repaired section delaminates along with the unrepaired section (i.e. cohesive failure) and not failure along the bond line where the patch is bonded (i.e. adhesive failure).

EXAMPLE 15

A graphite laminate is prepared in the following manner using the wet lay-up technique:

Eight plys of unidirectional graphite fabric (Knytex with 99:1 ratio) are laid down on MYLAR, each layer being wet out with a rubber modified vinyl ester resin of Example 4. The resin is promoted with cobalt naphthenate (0.3 wt. %) and dimethylaniline (0.1 wt %). Methylethylketone peroxide (2.5 wt. %) is used as the catalyst. The lay-up is then covered with a layer of MYLAR film and pressed between two plates. The laminate is cured for one hour at 200° F. at 30 psig (206.8 kPa). The resultant laminate has a flexural strength of 111,000 psi (765,000 kPa), a flexural modulus of 10.1×10$^6$ psi (69.6×10$^6$ kPa) and a thickness of 0.076 in. (1.93 mm).

EXAMPLE 16

A graphite laminate, prepared in the manner of Example 15, is taken and half of its thickness removed from a section two inches long by grinding. A wet lay-up repair of this reduced thickness section is then conducted by cutting fabric of the type described in Example 15 to match the reduced thickness section, and laying the fabric in the hollow of this section while wetting out each layer. The resin used, a rubber modified vinyl ester resin, is the same as that employed in Example 4, promoted with cobalt naphthenate and dimethyl aniline and catalysed with methylethylketone peroxide. The mix ratios are identical to those used in Example 15. After the hollow is filled with wet fabric to a thickness matching the original thickness, MYLAR film is layed on top of the wet fabric. The section is then placed in a press and cured for one hour at 200° F. and 30 psig (206.8 kPa).

The average flexural strength of the laminate is determined by conducting the mechanical analysis of the specimen from both the top and bottom of the repaired section. The repaired laminate has the following properties.

| | |
|---|---|
| Flex. strength (top) = | 99,000 psi (682,585 kPa) |
| Flex. strength (bottom) = | 118,000 psi (813,586 kPa) |
| Average = | 109,000 psi (751,533 kPa) |
| Flexural Modulus (top) = | 10.6 × 10$^6$ psi (73.1 × 10$^6$ kPa) |
| Flex. Modulus (bottom) = | 10.4 × 10$^6$ psi (71.7 × 10$^6$ kPa) |
| Average = | 10.5 × 10$^6$ psi (72.4 × 10$^6$ kPa) |

EXAMPLE 17

A panel is prepared and repaired in the same manner as in Example 14, except that the rubber modified vinyl ester resin of Example 6 is used. The promoter/catalyst combination and curing conditions are the same as that employed in Example 14. A section of the panel containing the hollowed out area is subjected to failure analysis. The panel is observed to fail such that the repaired section delaminates along with the unrepaired section (cohesive failure).

EXAMPLE 18

A vinyl ester resin of Example 9 is charged with 1.2 phr (parts per hundred parts of resin by weight) of methylethylketone peroxide and 0.2 phr of 6 wt. % cobalt naphthenate accelerator. A piece of 8 in.×8 in. (203.2 mm×203.2 mm) 8 harness satin weave AS-4 graphite fabric (15.2 g) is placed in a sealable plastic bag and approximately 25 ml of the catalyzed vinyl ester resin is added. The plastic bag is sealed and the resin is coated evenly onto the fabric by use of a wooden tongue depressor. A total of 4 pieces of fabric are prepared in this manner. The plastic bags are cut on three sides and peeled away from the resin impregnated fabric which is stacked into a 4 ply uncured composite. This wet lay-up is placed onto a piece of MYLAR (as a release ply) on top of a aluminum plate. The wet lay-up is covered with a peel ply perforated TEFLON, a bleeder cloth, and non perforated TEFLON all cut to size, 8 in.×8 in. (203.2 mm×203.2 mm). This system is then covered with a breather cloth, TEFLON, another breather cloth and finally a vacuum bag held down with tacky tape. A vacuum is pulled on the system to insure that the system is air tight. The system is placed in an oven at room temperature which is warmed to 190° F. and held at this temperature for 3 hours. The composite part that is formed is 73% by weight graphite and 27% by weight resin.

EXAMPLE 19

A laminate prepared in a manner similar to that of Example 18 is prepared except that the vinyl ester resin of Example 1A is used and that 6 plies are used and a small amount (10 g) of resin is added above and below the wet layup. In addition, a second vacuum bag is added on top of the first vacuum bag with one layer of breather cloth between them. The vacuum is pulled on the inner bag for two minutes. Then vacuum is pulled on the outer bag during the cure cycle, (room temperature to 190° F.) and held at 190° F. (88° C.) for 3 hours. The composite part is 53% by weight graphite and 47% by weight resin.

What is claimed is:

1. In a method for patching damaged composite articles which comprises (a) removing grossly damaged composite from the damaged part, if necessary, and roughening the area to be repaired including an area immediately surrounding the area to be repaired by any suitable means: (b) removing dust and loose particles from the previously roughened area by any suitable means: (c) optionally cleansing the roughened area with a suitable solvent: and (d) either (i) placing one or more plies of a substrate material saturated with a curable resinous composition and retaining said saturated substrate material in place by any suitable means until the composition has gelled sufficiently that any retaining means can be removed: or (ii) bonding to the damaged area of the composite article in the area which has been previously roughened and cleaned one or more plies of metal or reinforced plastic material employing a curable resinous composition as an adhesive for bonding the metal or reinforced plastic material to the damaged area: and (e) subjecting the thus treated damaged area to sufficient heat and pressure to cure the adhesive or saturated substrate material; the improvement which comprises employing as the curable resinous composition, a composition which comprises (A) one or more vinyl ester resins modified with one or more rubbers or elastomers: optionally (B) at least one polymerizable ethylenically unsaturated monomer: (C) one or more curing agents or curing catalysts for the vinyl ester resin(s): and optionally, (D) one or more accelerators for the curing agent(s) or curing catalyst(s).

2. The method of claim 1 wherein said rubber or elastomer modified vinyl ester resin, component (A) is selected from
(1) a vinyl ester resin selected from
   (a) vinyl ester resins prepared by reacting at least one ethylenically unsaturated monocarboxylic acid with an epoxy resin having an average of not more than 2 vicinal epoxy groups per molecule and an EEW of from about 170 to about 600: and optionally either or both of the following resins (b) and (c)
   (b) vinyl ester resins prepared by reacting an ethylenically unsaturated monocarboxylic acid with an epoxy resin which is the polyglycidyl ether of an adduct of an ethylenically unsaturated hydrocarbon and a compound having at least one phenolic hydroxyl group per molecule, said epoxy resin having an average of more than 2 vicinal epoxy groups per molecule and an EEW of from about 150 to about 350: or
   (c) vinyl ester resins prepared by reacting at least one ethylenically unsaturated monocarboxylic acid with an epoxy resin which is a polyglycidyl ether of a novolac resin prepared by reacting an aldehyde with a compound having at least one phenolic hydroxyl group per molecule, said epoxy resin having an average of more than 2 vicinal epoxy groups per molecule and an EEW of from about 150 to about 220: wherein at least one of said vinyl ester resins has been modified with a rubber or elastomer wherein the total amount of rubber or elastomer is from about 2 to about 20 percent by weight based on total weight of components (A) and (B): or
(2) a vinyl ester resin which has been prepared by reacting at least one ethylenically unsaturated monocarboxylic acid with an epoxy resin selected from
   (a) a diglycidyl ether of a compound having two aromatic hydroxyl groups per molecule, said diglycidyl ether having an EEW of from about 170 to about 600: and optionall either or both of the following resins (b) and (c)
   (b) a polyglycidyl ether of an adduct of an ethylenically unsaturated hydrocarbon and a compound having at least one phenolic hydroxyl group per molecule, said polyglycidyl ether having an average of more than 2 vicinal epoxy groups per molecule and an EEW of from about 150 to about 350: or
   (c) a polyglycidyl ether of novolac resin prepared by reacting an aldehyde with a compound having at least one phenolic hydroxyl group per molecule, said polyglycidyl ether having an average of more than 2 vicinal epoxy groups per molecule and an EEW of from about 150 to about 220: and
   (d) a rubber or elastomer in an amount of from about 2 to about 20 percent by weight based on total weight of components (A) and (B): and optionally
(B) at least one polymerizable ethylenically unsaturated monomer:
and wherein component (B) is present in an amount of from about zero to about 60 percent by weight based on the combined weight of components (A) and (B).

3. The method of claim 2 wherein
(a) when component (A) is component (A-1), then component (A-1-a) is present in an amount which corresponds to from about 20 to about 90 percent by weight of the combined weight of components (A-1-a), (A-1-b) and (A-1-c) and components (A-1-b) and (A-1-c) are present in an amount which corresponds to from about 10 to about 80 percent by weight of the combined weight of components (A-1-a), (A-1-b) and (A-1-c): and the total amount of rubber or elastomer is from about 3 to about 12 percent by weight based on total resin weight including any monomer;
(b) when component (A) is component (A-2), then component (A-2-a) is present in an amount which corresponds to from about 20 to about 90 percent by weight of the combined weight of components (A-2-a), (A-2-b) and (A-2-c) and components (A-2-b) and (A-2-c) are present in an amount which corresponds to from about 10 to about 80 percent by weight of the combined weight of components (A-2-a), (A-2-b) and (A-2-c): and component (A-2-d) is present in an amount which corresponds to from about 3 to about 12 percent by weight based on the combined weight of the vinyl ester resins: and
(c) component (B) is present in an amount which corresponds to from about 10 to about 55 percent by weight of the combined weight of components (A) and (B).

4. A method of claim 2 wherein
(a) when component (A) is component (A-1), then component (A-1-a) is present in an amount which corresponds to from about 25 to about 50 percent by weight of the combined weight of components (A-1-a), (A-1-b) and (A-1-c) and components (A-1-b) and (A-1-c) are present in an amount which corresponds to from about 50 to about 75 percent by weight of the combined weight of components (A-1-a), (A-1-b) and (A-1-c) and the total amount of rubber or elastomer is from about 3 to about 10 percent by weight based on total resin weight including any monomer;
(b) when component (A) is component (A-2), then component (A-2-a) is present in an amount which corresponds to from about 25 to about 50 percent by weight of the combined weight of components (A-2-a), (A-2-b) and (A-2-c) and components (A-2-b) and (A-2-c) are present in an amount which corresponds to from about 50 to about 75 percent by weight of the combined weight of components (A-2-a), (A-2-b) and (A-2-c); and component (A-2-d) is present in an amount which corresponds to from about 3 to about 10 percent by weight based on the combined weight of the vinyl ester resins; and
(c) component (B) is present in an amount which corresponds to from about 20 to about 50 percent by weight of the combined weight of components (A) and (B).

5. A method of claim 2 wherein
(a) component (A) is component (A-1) wherein component (A-1-a) is a vinyl ester resin prepared from a diglycidyl ether of a bisphenol having an EEW of from about 170 to about 360 and acrylic acid, methacrylic acid, or a combination thereof; component (A-1-b) is a vinyl ester resin prepared from a polyglycidyl ether of an adduct of phenol or a substituted phenol and cyclopentadiene or an oligomer thereof having an EEW of from about 200 to about 300 and acrylic acid, methacrylic acid, or a combination thereof: component (A-1-c) is a vinyl ester resin prepared from a polyglycidyl ether of an adduct of phenol or a substituted phenol and an aldehyde having an EEW of from about 150 to about 220 and acrylic acid, methacrylic acid, or a combination thereof; and the rubber or elastomer is a carboxyl-containing acrylonitrile-butadiene copolymer or a 2-ethylhexyl acrylate copolymer rubber or grafted rubber particles having a rubbery core and a grafted polymer shell; and
(b) component (B) is styrene, α-methyl styrene, vinyl toluee, diallyl phthalate, methyl methacrylate, divinyl benzene or a combination thereof;
(c) component (C) is methyl ethyl ketone peroxide, dibenzoyl peroxide, cumene hydroperoxide or a combination thereof; and
(d) component (D), when present, is N,N-dimethyl aniline, N,N-diethyl aniline, N,N-dimethyl toluidine, N,N-dimethyl acetoacetamide, cobalt naphthenate, vanadium neodecanoate, or a combination thereof.

6. A method of claim 5 wherein
(a) component (A) is component (A-1) wherein component (A-1-a) is a vinyl ester resin prepared from a diglycidyl ether of bisphenol A having an EEW of from about 170 to about 250 and methacrylic acid; component (A-1-b) is a vinyl ester resin prepared from a polyglycidyl ether of an adduct of phenol and cyclopentadiene or an oligomer thereof and methacrylic acid; and component (A-1-c) is a vinyl ester resin prepared from a polyglycidyl ether of an adduct of phenol and formaldehyde having an EEW of from about 170 to about 190 and methacrylic acid: and
(b) component (B) is styrene, divinylbenzene or a combination thereof.

7. A method of claim 3 wherein
(a) component (A) is component (A-1) wherein component (A-1-a) is a vinyl ester resin prepared from a diglycidyl ether of a bisphenol having an EEW of from about 170 to about 360 and acrylic acid, methacrylic acid, or a combination thereof; component (A-1-b) is a vinyl ester resin prepared from a polyglycidyl ether of an adduct ofphenol or a substituted phenol and cyclopentadiene or an oligomer thereof having an EEW of from about 200 to about 300 and acrylic acid, methacrylic acid, or a combination thereof; component (A-1-c) is a vinyl ester resin prepared from a polyglycidyl ether of an adduct of phenol or a substituted phenol and an aldehyde having an EEW of from about 150 to about 220 and acrylic acid, methacrylic acid, or a combination thereof; and the rubber or elastomer is a carboxyl-containing acrylonitrile-butadiene copolymer or a 2-ethylhexyl acrylate copolymer rubber;
(b) component (B) is styrene, α-methyl styrene, vinyl toluene, diallyl phthalate, methyl methacrylate, divinyl benzene or a combination thereof;
(c) component (C) is methyl ethyl ketone peroxide, dibenzoyl peroxide, cumene hydroperoxide or a combination thereof; and
(d) component (D), when present, is N,N-dimethyl aniline, N,N-diethyl aniline, N,N-dimethyl toluidine, N,N-dimethyl acetoacetamide, cobalt naphthenate, vanadium neodecanoate, or a combination thereof.

8. A method of claim 7 wherein
(a) component (A) is component (A-1) wherein component (A-1-a) is a vinyl ester resin prepared from a diglycidyl ether of bisphenol A having an EEW of from about 170 to about 250 and methacrylic acid; component (A-1-b) is a vinyl ester resin prepared from a polyglycidyl ether of an adduct of phenol and cyclopentadiene or an oligomer thereof and methacrylic acid; and component (A-1-c) is a vinyl ester resin prepared from a polyglycidyl ether of an adduct of phenol and formaldehyde having an EEW of from about 170 to about 190 and methacrylic acid; and
(b) component (B) is styrene, divinylbenzene or a combination thereof.

9. A method of claim 2 wherein
(a) component (A) is component (A-2) wherein component (A-2-a) is a diglycidyl ether of a bisphenol having an EEW of from about 170 to about 360;

component (A-2-b) is a polyglycidyl ether of an adduct of phenol or a substituted phenol and cyclopentadiene or an oligomer thereof having an EEW of from about 200 to about 300; component (A-2-c) is a polyglycidyl ether of an adduct of phenol or a substituted phenol and an aldehyde having an EEW of from about 150 to about 220; and the rubber or elastomer is a carboxyl-containing acrylonitrile-butadiene copolymer or a 2-ethyl hexyl acrylate copolymer rubber or grafted rubber particles having a rubbery core and a grafted polymer shell; and (b) component (B) is styrene, α-methyl styrene, vinyl toluene, diallyl phthalate, methyl methacrylate, divinyl benzene or a combination thereof;

(c) component (C) is methyl ethyl ketone peroxide, dibenzoyl peroxide, cumene hydroperoxide or a combination thereof; and (d) component (D), when present, is N,N-dimethyl aniline, N,N-diethyl aniline, N,N-dimethyl toluidine, N,N-dimethyl acetoacetamide, cobalt naphthenate, vanadium neodecanoate, or a combination thereof.

10. A method of claim 9 wherein
(a) component (A-2-a) is a diglycidyl ether of bisphenol A having an EEW of from about 170 to about 250;
(b) component (A-2-b) is a polyglycidyl ether of an adduct of phenol and cyclopentadiene or an oligomer thereof;
(c) component (A-2-c) is a polyglycidyl ether of an adduct of phenol and formaldehyde having an EEW of from about 170 to about 190; and
(d) component (B) is styrene, divinylbenzene or a combination thereof.

11. A method of claim 3 wherein
(a) component (A) is component (A-2) wherein component (A-2-a) is a diglycidyl ether of a bisphenol having an EEW of from about 170 to about 360; component (A-2-b) is a polyglycidyl ether of an adduct of phenol or a substituted phenol and cyclopentadiene or an oligomer thereof having an EEW of from about 200 to about 300; component (A-2-c) is a polyglycidyl ether of an adduct of phenol or a substituted phenol and an aldehyde having an EEW of from about 150 to about 220; and the rubber or elastomer is a carboxyl-containing acrylonitrile-butadiene copolymer or a 2ethylhexyl acrylate copolymer rubber;

(b) component (B) is styrene, α-maethyl styrene, vinyl toluene, diallyl phthalate, methyl methacrylate, divinyl benzene or a combination thereof;

(c) component (C) is methyl ethyl ketone peroxide, dibenzoyl peroxide, cumene hydroperoxide or a combination thereof; and (d) component (D), when present, is N,N-dimethyl aniline, N,N-diethyl aniline, N,N-dimethyl toluidine, N,N-dimethyl acetoacetamide, cobalt naphthenate, vanadium neodecanoate, or a combination thereof.

12. A method of claim 11 wherein
(a) component (A-2-a) is a diglycidyl ether of bisphenol A having an EEW of from about 170 to about 250;
(b) component (A-2-b) is a polyglycidyl ether of an adduct of phenol and cyclopentadiene or an oligomer thereof;
(c) component (A-2-c) is a polyglycidyl ether of an adduct of phenol and formaldehyde having an EEW of from about 170 to about 190; and
(d) component (B) is styrene, divinylbenzene or a combination thereof.

* * * * *